US012687070B2

(12) United States Patent
Beggs et al.

(10) Patent No.: US 12,687,070 B2
(45) Date of Patent: Jul. 21, 2026

(54) LADDER FEET

(71) Applicant: Werner Co., Itasca, IL (US)

(72) Inventors: Robert D. Beggs, Stoneboro, PA (US); Thomas W. Parker, Jamestown, PA (US); Steven R. Dings, Mentor, OH (US); Joseph C. Dangrow, Mercer, PA (US)

(73) Assignee: Werner Co., Itasca, IL (US)

( * ) Notice: Subject to any disclaimer, the term of this patent is extended or adjusted under 35 U.S.C. 154(b) by 0 days.

(21) Appl. No.: 18/443,638

(22) Filed: Feb. 16, 2024

(65) Prior Publication Data

US 2024/0191575 A1 Jun. 13, 2024

Related U.S. Application Data

(62) Division of application No. 15/878,089, filed on Jan. 23, 2018, now Pat. No. 11,933,106.

(51) Int. Cl.

*E06C 7/46* (2006.01)
*E06C 1/18* (2006.01)
*E06C 7/42* (2006.01)
*E06C 7/16* (2006.01)

(52) U.S. Cl.

CPC .................. *E06C 7/46* (2013.01); *E06C 1/18* (2013.01); *E06C 7/42* (2013.01); *E06C 7/16* (2013.01)

(58) Field of Classification Search

CPC ... E06C 7/46; E06C 7/42; E06C 7/423; E06C 7/44; E06C 1/18
USPC .......................................................... 182/108
See application file for complete search history.

(56) References Cited

U.S. PATENT DOCUMENTS

| | | | |
|---|---|---|---|
| 1,243,844 | A | 10/1917 | Lofstrom |
| 1,293,066 | A | 2/1919 | Faulkner |
| 1,352,323 | A | 9/1920 | Johan |
| 1,382,833 | A | 6/1921 | Hurd |
| 1,431,068 | A | 10/1922 | Waney |
| 1,436,804 | A | 11/1922 | Hubbard |
| 1,459,350 | A | 6/1923 | Veniero |
| 1,496,201 | A | 6/1924 | Baxter |
| 1,543,723 | A | 6/1925 | Rivitz |

(Continued)

FOREIGN PATENT DOCUMENTS

| | | |
|---|---|---|
| GB | 2360548 | 9/2001 |
| IT | 20180000297 | 2/2018 |

(Continued)

OTHER PUBLICATIONS

US D973,231 S, 12/2022, Maxfield (withdrawn)

(Continued)

*Primary Examiner* — Marcus Menezes
(74) *Attorney, Agent, or Firm* — Fitch, Even, Tabin, Flannery LLP

(57) ABSTRACT

A ladder includes a foot having a plastic body with a recess which receives the end of a first rail and is positioned about and conforms to the web and the first and second flanges of the first rail. The foot has a plastic base having a top side from which the body extends. The foot has a metal rail fastener which extends through the body and the rail to attach the body and the rail together. The foot has a pad and a metal pad fastener that extends entirely through the pad and entirely through the base to attach the pad to the base.

18 Claims, 17 Drawing Sheets

(56) References Cited

U.S. PATENT DOCUMENTS

| | | | | |
|---|---|---|---|---|
| 1,558,479 | A | 10/1925 | Hearn | |
| 1,570,576 | A | 1/1926 | Rivitz | |
| 1,600,103 | A | 9/1926 | Evans | |
| 1,879,017 | A | 9/1932 | Babitt | |
| 1,973,226 | A | 9/1934 | Rose | |
| 2,163,970 | A | 6/1939 | White | |
| 2,277,939 | A | 3/1942 | Thalhammer | |
| 2,309,484 | A | 1/1943 | Van Meter | |
| 2,407,575 | A | 9/1946 | Ramsey | |
| 2,503,626 | A | 4/1950 | Mayberry | |
| 2,567,989 | A | 9/1951 | Cheek | |
| 2,605,037 | A | 7/1952 | Wilbert | |
| 2,623,679 | A | 12/1952 | Agombar | |
| 2,691,479 | A | 10/1954 | Sharp | |
| 2,767,898 | A | 10/1956 | Cramer | |
| 3,005,513 | A | 10/1961 | Larson | |
| 3,099,103 | A | 7/1963 | Wright | |
| 3,805,917 | A | 4/1974 | Luther | |
| 3,913,942 | A | 10/1975 | Mackenzie | |
| 3,948,352 | A | 4/1976 | Larson | |
| 4,023,828 | A | 5/1977 | Mackenzie | |
| 4,304,318 | A | 12/1981 | Webb | |
| 4,415,062 | A * | 11/1983 | Shaw | E06C 7/46 182/109 |
| 4,474,387 | A | 10/1984 | Maranell | |
| 4,546,996 | A | 10/1985 | Hanson | |
| 4,699,247 | A | 10/1987 | Clarke | |
| 4,748,734 | A | 6/1988 | Schmitt | |
| 5,054,812 | A | 10/1991 | Lagsdin | |
| 5,141,076 | A | 8/1992 | Joyce | |
| 5,154,255 | A | 10/1992 | Kiska | |
| 5,370,203 | A | 12/1994 | Kiska | |
| D359,366 | S | 6/1995 | Spevak | |
| 5,427,342 | A | 6/1995 | Gagnon | |
| 5,522,473 | A | 6/1996 | Moselsky | |
| 5,547,220 | A | 8/1996 | Lagsdin | |
| 5,636,706 | A | 6/1997 | Plotner | |
| 5,645,272 | A | 7/1997 | Brennan, Sr. | |
| 5,791,435 | A | 8/1998 | Garnett | |
| 5,791,439 | A | 8/1998 | Plotner | |
| 5,908,085 | A | 6/1999 | Lovelady | |
| 5,918,698 | A | 7/1999 | Lunn | |
| 5,957,496 | A | 9/1999 | Lagsdin | |
| 6,012,546 | A | 1/2000 | Bee | |
| 6,044,929 | A | 4/2000 | Wishner | |
| 6,142,325 | A | 11/2000 | Chomik | |
| 6,227,570 | B1 | 5/2001 | Martinez | |
| 6,422,603 | B2 | 7/2002 | Lagsdin | |
| 6,499,563 | B1 | 12/2002 | Bremick | |
| 6,634,672 | B1 | 10/2003 | Lagsdin | |
| 7,000,731 | B2 * | 2/2006 | Swiderski | E06C 7/46 182/108 |
| 7,028,808 | B2 | 4/2006 | Zeaman | |
| 7,207,534 | B2 | 4/2007 | Crain | |
| D555,258 | S | 11/2007 | Wirch | |
| 7,516,817 | B2 | 4/2009 | Pate | |
| 7,803,031 | B1 | 9/2010 | Winckler | |
| 7,837,010 | B2 * | 11/2010 | Astor | E06C 7/46 182/220 |
| D650,915 | S | 12/2011 | Gross | |
| 8,407,855 | B2 | 4/2013 | Gagnon | |
| D692,163 | S | 10/2013 | Magnus | |
| 8,807,277 | B1 * | 8/2014 | Reyna Lerma | E06C 7/42 182/108 |
| 9,145,687 | B1 | 9/2015 | Bancroft | |
| 9,435,155 | B2 | 9/2016 | Tiber | |
| D799,063 | S | 10/2017 | Yin | |
| 9,834,989 | B2 | 12/2017 | Lanzafame | |
| 10,017,989 | B1 | 7/2018 | Kellogg | |
| 10,138,682 | B2 | 11/2018 | Mora | |
| 10,206,511 | B2 | 2/2019 | Peters | |
| 10,612,302 | B2 * | 4/2020 | Maxfield | E06C 1/12 |
| D895,846 | S | 9/2020 | Adair | |
| D899,628 | S | 10/2020 | Moncada | |
| 10,808,459 | B2 | 10/2020 | Cook | |
| 11,131,142 | B2 | 9/2021 | Dings | |
| D935,053 | S | 11/2021 | Lentine | |
| D935,054 | S | 11/2021 | Maxfield | |
| 11,346,154 | B2 | 5/2022 | Major | |
| 11,408,226 | B2 | 8/2022 | Maxfield | |
| 11,441,355 | B2 | 9/2022 | Lawson | |
| D966,557 | S | 10/2022 | Maxfield | |
| D970,753 | S | 11/2022 | Collins | |
| 11,536,087 | B2 | 12/2022 | Tiber | |
| D975,317 | S | 1/2023 | Hu | |
| D999,404 | S | 9/2023 | Maxfield | |
| 11,891,857 | B2 | 2/2024 | Zhu | |
| 11,933,106 | B2 | 3/2024 | Beggs | |
| 12,084,918 | B2 | 9/2024 | Mora | |
| 2003/0079942 | A1 * | 5/2003 | Pettit | E06C 7/16 182/115 |
| 2004/0020715 | A1 | 2/2004 | Swiderski | |
| 2004/0178617 | A1 | 9/2004 | Lagsdin | |
| 2005/0011702 | A1 | 1/2005 | Zeaman | |
| 2006/0054391 | A1 | 3/2006 | Tilley | |
| 2006/0231334 | A1 | 10/2006 | Hall | |
| 2007/0221443 | A1 | 9/2007 | Nelson | |
| 2007/0227819 | A1 | 10/2007 | Layfield | |
| 2007/0246301 | A1 | 10/2007 | Shaffer | |
| 2008/0190697 | A1 * | 8/2008 | Skurkis | E06C 7/44 182/201 |
| 2010/0116592 | A1 | 5/2010 | Clements | |
| 2011/0017549 | A1 | 1/2011 | Lietz | |
| 2011/0139544 | A1 | 6/2011 | Frick | |
| 2012/0175188 | A1 | 7/2012 | Xu | |
| 2012/0261214 | A1 | 10/2012 | Dondurur | |
| 2014/0001333 | A1 | 1/2014 | Stephen | |
| 2014/0238777 | A1 | 8/2014 | Adair | |
| 2014/0332316 | A1 | 11/2014 | Tiber | |
| 2014/0353084 | A1 | 12/2014 | Lafontaine | |
| 2015/0159435 | A1 | 6/2015 | Vela | |
| 2017/0370520 | A1 | 12/2017 | Knickrehm | |
| 2018/0094403 | A1 * | 4/2018 | Nobles | B60S 9/02 |
| 2018/0171714 | A1 | 6/2018 | Dings | |
| 2018/0179821 | A1 | 6/2018 | Mora | |
| 2018/0230746 | A1 | 8/2018 | Maxfield | |
| 2019/0078386 | A1 | 3/2019 | Mora | |
| 2019/0226279 | A1 | 7/2019 | Beggs | |
| 2020/0232278 | A1 * | 7/2020 | Maxfield | E06C 7/46 |
| 2020/0240210 | A1 | 7/2020 | Maxfield | |
| 2020/0325727 | A1 | 10/2020 | Reyes Acosta | |
| 2022/0010621 | A1 | 1/2022 | Dings | |
| 2022/0018189 | A1 | 1/2022 | Coulter | |
| 2022/0316276 | A1 | 10/2022 | Maxfield | |
| 2023/0122566 | A1 | 4/2023 | Heinrichs | |

FOREIGN PATENT DOCUMENTS

| | | |
|---|---|---|
| MX | 2019012208 | 1/2020 |
| WO | 202371975 | 5/2023 |

OTHER PUBLICATIONS

1999 Louisville Ladder Catalog—Available on or before May 18, 1999, 11 pages.

2001 Louisville Ladder Website Catalog—Available on or before Jan. 17, 2001, 1 page.

2001 Louisville Ladder Catalog—Available on or before Jun. 30, 2001, 5 pages.

2000 Werner T7200 Brochure—Available on or before Apr. 30, 2000, 1 page.

Copyright registration of Modern Plastics Handbook, Mar. 13, 2000, 1 page.

Harper, Charles A., Modern Plastics Handbook—Available on or before Mar. 13, 2000, 268 pages.

Huntsman Website Excerpts—Available on or before Jul. 10, 2001, submitted in IPR 2019-00336 with Affidavit of Christopher Butler, 6 pages.

1996 Werner Catalog—Available on or before Dec. 31, 1996, 2 pages.

1999 Louisville Ladder Rhino 375 Press Release—Available on or before Aug. 29, 1999, 1 page.

(56) References Cited

OTHER PUBLICATIONS

FM1100HD Series ladder website—available on or before Aug. 28, 1999, 1 page.
FP1100HD Series step ladder website—Available on or before Aug. 28, 1999, 1 page.
Rhino 375 Website registration—Available on or before Apr. 19, 2001, 1 page.
Louisville Ladder Accessories website—Available on or before Feb. 17, 2001, 1 page.
FS1000 Series Ladder website—Available on or before Jan. 17, 2001, 1 page.
Rhino 375 Fiberglass Mechanic Step Ladder website—Available on or before Jan. 17, 2001, 1 page.
Declaration of Jon B. Ver Halen submitted in IPR 2019-00336—Available on or before Mar. 22, 2019, 112 pages.
IPR Petition submitted in IPR 2019-00336—U.S. Pat. No. 7,000,731—on Mar. 22, 2019, 73 pages.
Declaration of Thomas J. Schmitt submitted in IPR 2019-00336—Available on or before Nov. 22, 2019, 41 pages.
Declaration of Mack A. Quan submitted in IPR 2019-00336—Available on or before Nov. 22, 2019, 40 pages.
Web page for Louisville Ladder Series FM1500 3-Foot Fiberglass Ladder—Available on or before Jan. 21, 2020, 3 pages.
Web page for Louisville Ladder Series FS1500 3-Foot Fiberglass Ladder—Available on or before Jan. 21, 2020, 4 pages.
Collection of web pages for various Louisville Ladders—Available on or before Jan. 21, 2020, 33 pages.
Excerpts from McGraw-Hill Dictionary of Scientific and Technical Terms, Sixth Edition, McGraw-Hill Available on or before Dec. 31, 2003, 5 pages.
Petitioners Demonstrative Exhibits submitted in IPR 2019-00336—Available on or before May 28, 2020, 104 pages.
Patent Owner Demonstrative Exhibits submitted in IPR 2019-00336—Available on or before May 28, 2020, 48 pages.
Gorilla Ladders 300 lb. capacity 2.5 FT Stool Size Brochure/Specification Sheet—depicting a product that was publicly available on or before Jun. 6, 2024, 1 page.
Littlegiantladders.com, Web page for Little Giant Mightylite 2.0 Fiberglass Stepladder—depicting a product that was publicly available on or before Jun. 6, 2024, 26 pages. https://www.littlegiantladders.com/products/mightylite-2-0.
Louisville Ladder Fiberglass Step Ladder Series FS1500 Brochure/Specification Sheet—depicting a product that was publicly available on or before Jun. 6, 2024, 2 pages.
Werner Co., MT Series Lightweight Multi-Position Ladder Brochure/Specification Sheet—depicting a product that was publicly available on or before Jun. 6, 2024, 2 pages.
Werner.com, Web page for FS100 Series Step Ladders | Werner US—depicting a product that was publicly available on or before Jun. 6, 2024, 3 pages. https://www.wernerco.com/us/products/ladders/step-ladders/FS100Series.
Werner.com, Web page for FS204 Step Ladders | Werner US—depicting a product that was publicly available on or before Jun. 6, 2024, 11 pages. https://www.wernerco.com/us/products/ladders/step-ladders/FS200Series/FS204.
Yosoo, Ladder Feet Covers—depicting a product that was publicly available on or before Jul. 8, 2024, 7 pages. https://www.amazon.ca/Replacement-Rubber-Ladder-Cover-Cushion/dp/B01N0OVD1F.

* cited by examiner

LADDER FEET

CROSS-REFERENCE TO RELATED APPLICATIONS

This application is a divisional of prior U.S. application Ser. No. 15/878,089, filed Jan. 23, 2018, of which the entirety of the disclosures is incorporated by reference herein.

FIELD OF THE INVENTION

The present invention is related to a ladder having a foot with an overmolded pad at the bottom of each rail of the ladder. (As used herein, references to the "present invention" or "invention" relate to exemplary embodiments and not necessarily to every embodiment encompassed by the appended claims.) More specifically, the present invention is related to a ladder having a foot with an overmolded pad at the bottom of each rail of the ladder where the overmolded pad has a rubber tread that surrounds a rigid plate.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Whenever a ladder is used, one concern is a stable and secure support of the ladder against the floor or ground. A foot placed on the bottom of each rail of the ladder is used to better achieve the desired stable and secure support of the ladder against the floor or ground. The foot has a surface there better adapts and conforms to the floor or ground than the bottom of a rail itself. The foot attaches to the bottom of the rail and acts as an extension of the bottom of the rail to interact with the floor or ground. To achieve a better interaction of the ladder rail with the floor or ground, the material that actually contacts the floor or ground of the foot has a moldable or adaptable characteristic and grips the floor or ground and provides a greater surface area with the floor or ground than the material that attaches to the bottom of the rail, which generally is firmer and stronger structurally to form a better attachment with the rail. However, because the material that contacts the ground is softer and different than the material that directly contacts the rail, the softer material is susceptible to separating, tearing or pulling off the harder material, plastic, that directly attaches to the rail.

BRIEF SUMMARY OF THE INVENTION

The present invention pertains to a ladder. The ladder comprises a first rail having a bottom and a web, a first flange attached to a first end of the web and a second flange attached to a second end of the web. The ladder comprises a second rail. The ladder comprises rungs attached to the first rail and second rail upon which a user steps to climb the ladder. The ladder comprises a foot having a plastic body with a recess which receives the end of the first rail and is positioned about and conforms to the web and the first and second flanges of the first rail. The foot has a plastic base having a top side from which the body extends. The base has a front edge. The foot has a metal rail fastener which extends through the body and the rail to attach the body and the rail together. The foot has a pad having a rigid plate with a rubber outer layer surrounding the rigid plate and a pad fastener hole that extends entirely through the rigid plate and rubber outer layer. The outer layer of the pad having a bottom with treads. The foot has a metal pad fastener that extends entirely through the pad and entirely through the base to attach the pad to the base so the rigid plate is between the treads and the base of the body.

The present invention pertains to a foot for a bottom of a rail of a ladder. The foot comprises a plastic body with a recess which receives the end of the first rail and is positioned about and conforms to a web and first and second flanges of the first rail. The foot comprises a plastic base having a top side from which the body. The base has a front edge. The foot has a metal rail fastener which extends through the body and the rail to attach the body and the rail together. The foot has a pad having a rigid plate with a rubber outer layer surrounding the rigid plate and a pad fastener hole that extends entirely through the rigid plate and rubber outer layer. The outer layer of the pad having a bottom with treads. The foot has a metal pad fastener that extends entirely through the pad and entirely through the base to attach the pad to the base so the rigid plate is between the treads and the base of the body.

The present invention pertains to a method for placing a ladder. The method comprises the steps of carrying the ladder to a desired location. The ladder comprises a first rail having a bottom and a web, a first flange attached to a first end of the web and a second flange attached to a second end of the web. The ladder comprises a second rail. The ladder comprises rungs attached to the first rail and second rail upon which a user steps to climb the ladder. The ladder comprises a foot having a plastic body with a recess which receives the end of the first rail and is positioned about and conforms to the web and the first and second flanges of the first rail. The foot has a plastic base having a top side from which the body extends. The base has a front edge. There is the step of standing the ladder on the foot so the tread contacts a floor or ground.

The present invention pertains to a method for forming a foot for a bottom of a first rail of a ladder rail. The method comprises the steps of placing a pad against a bottom surface of a base of the foot. The foot having a plastic body. The plastic base attached to the body. The plastic body having a recess which receives the end of the first rail and is positioned about and conforms to a web and first and second flanges of the first rail. The plastic base having a top side from which the body extends. The base having a front edge. There is the step of attaching a pad to the underside of the base. The foot has a metal rail fastener which extends through the body and the rail to attach the body and the rail together. The foot has a pad having a rigid plate with a rubber outer layer surrounding the rigid plate and a pad fastener hole that extends entirely through the rigid plate and rubber outer layer. The outer layer of the pad having a bottom with treads. The foot has a metal pad fastener that extends entirely through the pad and entirely through the base to attach the pad to the base so the rigid plate is between the treads and the base of the body.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
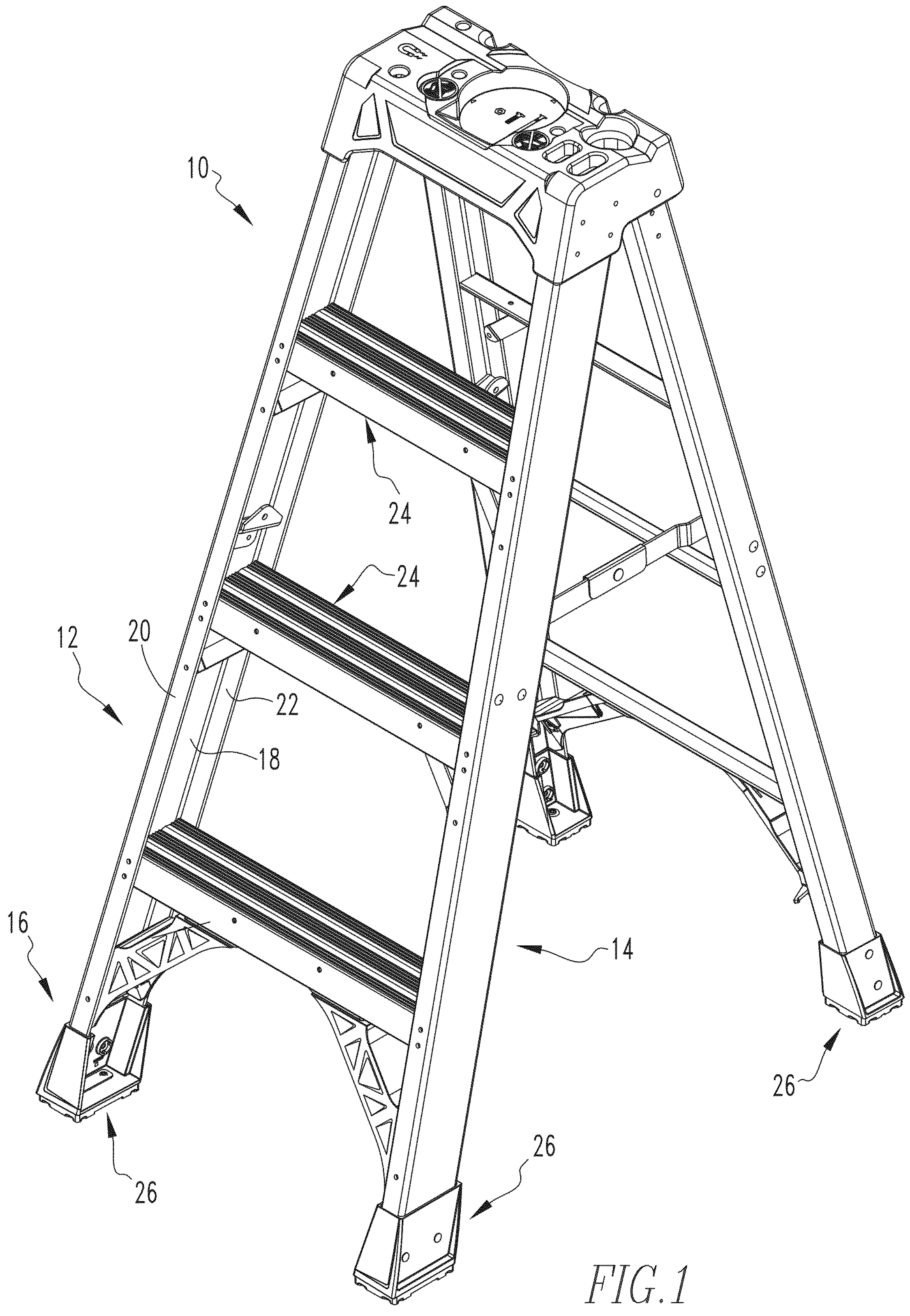
FIG. 1 shows an overall view of a ladder which has feet of the present invention.
Figure 2:
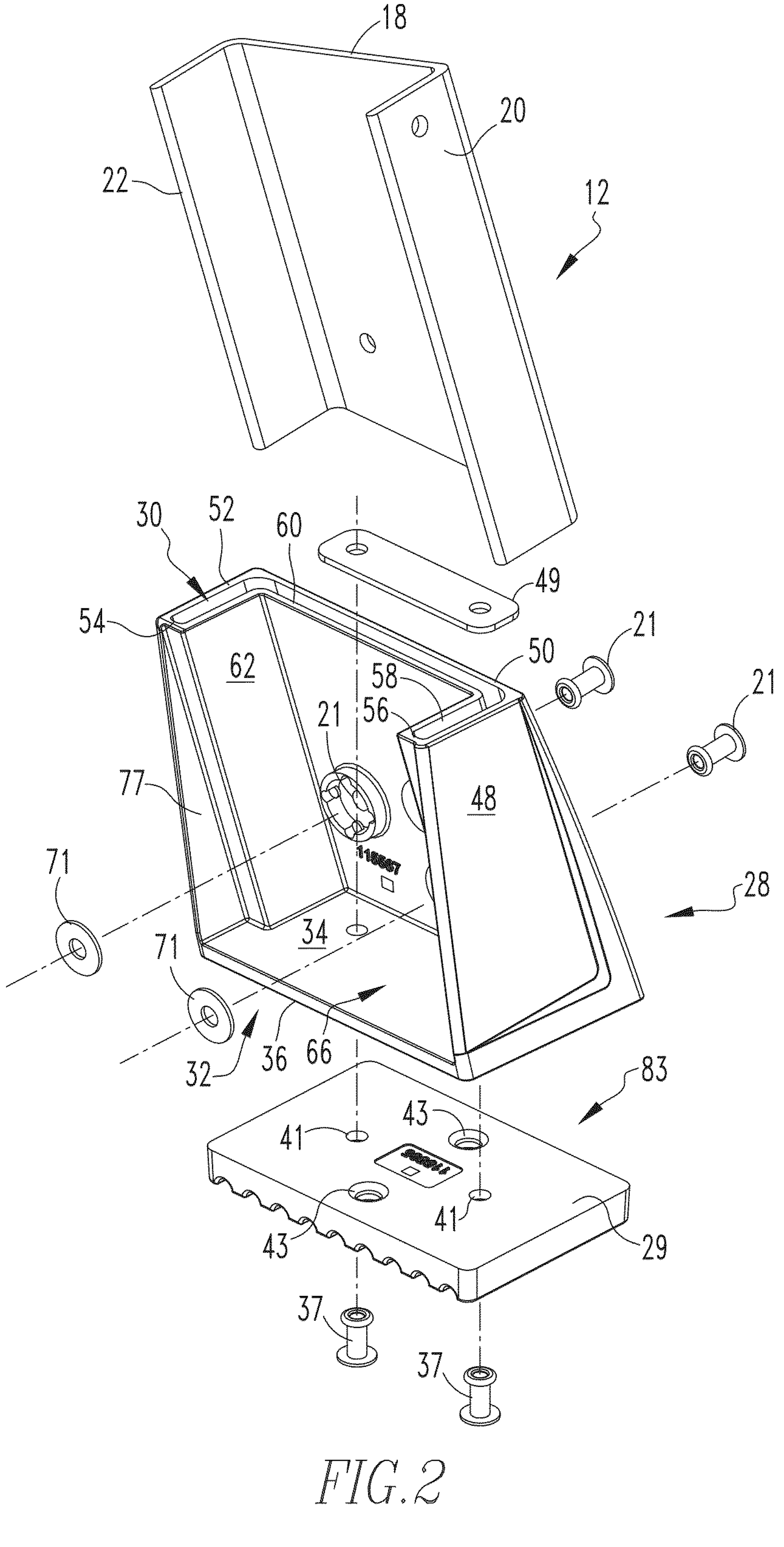
FIG. 2 shows an assembly view of the foot with respect to the rail.
Figure 3:
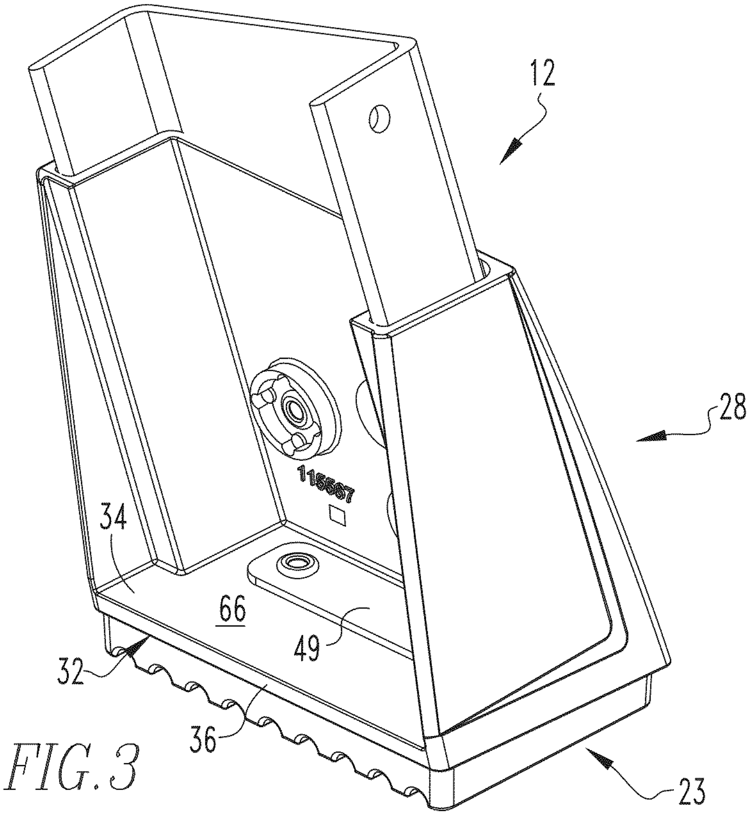
FIG. 3 shows a perspective view of the foot with the rail.
Figure 4:
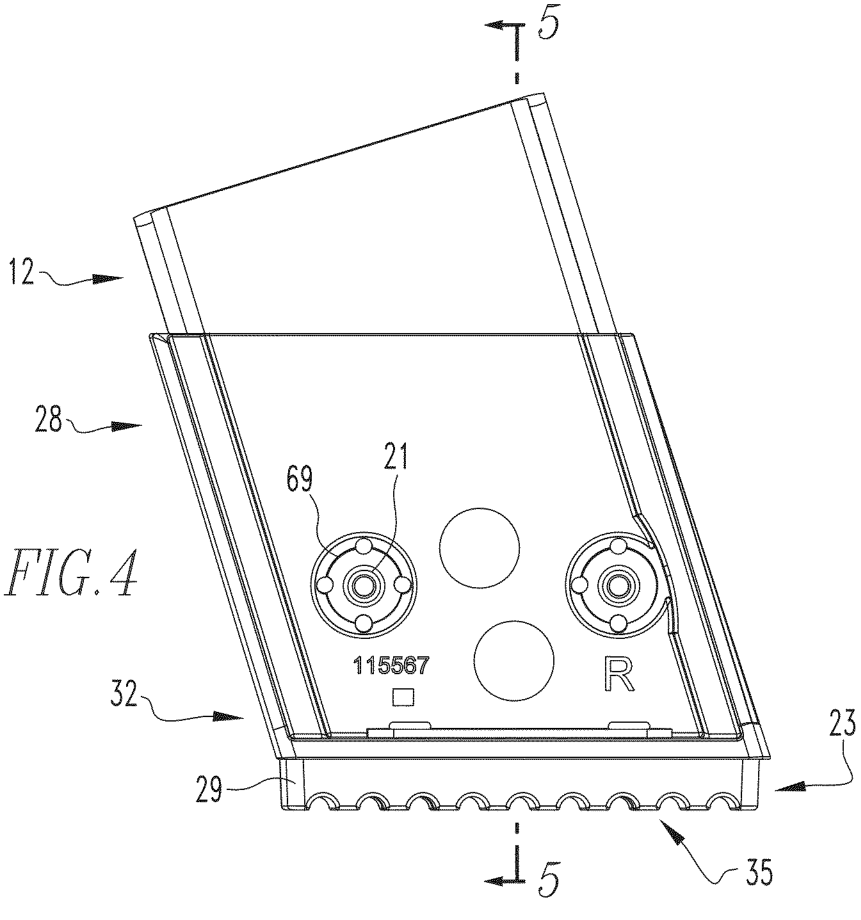
FIG. 4 shows a side view of the foot with the rail.
Figure 5:
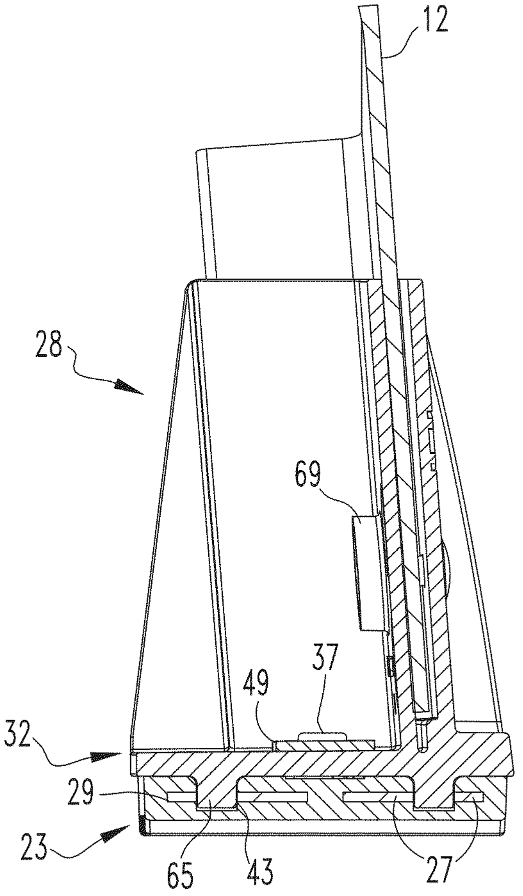
FIG. 5 shows a cutaway side view of the foot with the rail.

Referring now to the drawings wherein like reference numerals refer to similar or identical parts throughout the several views, and more specifically to FIGS. 1-5 thereof, there is shown a ladder 10. The ladder 10 comprises a first rail 12 having a bottom 16 and a web 18, a first flange 20 attached to a first end of the web 18 and a second flange 22 attached to a second end of the web 18. The ladder 10 comprises a second rail 14. The ladder 10 comprises rungs 24 attached to the first rail 12 and second rail 14 upon which a user steps to climb the ladder 10. The ladder 10 comprises a foot 26 having a plastic body 28 with a recess 30 which receives the end of the first rail 12 and is positioned about and conforms to the web 18 and the first and second flanges 20, 22 of the first rail 12. The foot 26 has a plastic base 32 having a bottom side 33 and a top side 34 from which the body 28 extends, preferably at a slight angle to accommodate the angle of the first rail 12 when the first rail 12 is in the in-use position and extending up from ground at an angle, as shown in FIG. 4. The base 32 has a front edge 36. The foot 26 has a metal rail fastener 21 which extends through the body 38 and the rail 12 to attach the body 28 and the rail 12 together. The foot 26 has a pad 23 having a rigid plate 27 with a rubber outer layer 29 surrounding the rigid plate and a pad fastener hole 41 that extends entirely through the rigid plate 27 and rubber outer layer 29 shown in FIGS. 7-11. The outer layer 29 of the pad 23 having a bottom with treads 35. The foot 26 has a metal pad fastener 37 that extends entirely through the pad 23 and entirely through the base 32 to attach the pad 23 to the base 32 so the rigid plate 27 is between the treads 35 and the base 32 of the body 28. By the base 32 being flat relative to the angle of the body 28 extending from the base 32, the pad 23 is flat on the ground, serving to better maintain the pad securely against the ground and avoid the first rail 12 from slipping or sliding relative to the ground, even though the first rail 12 is at an angle relative to ground.

Figure 9:
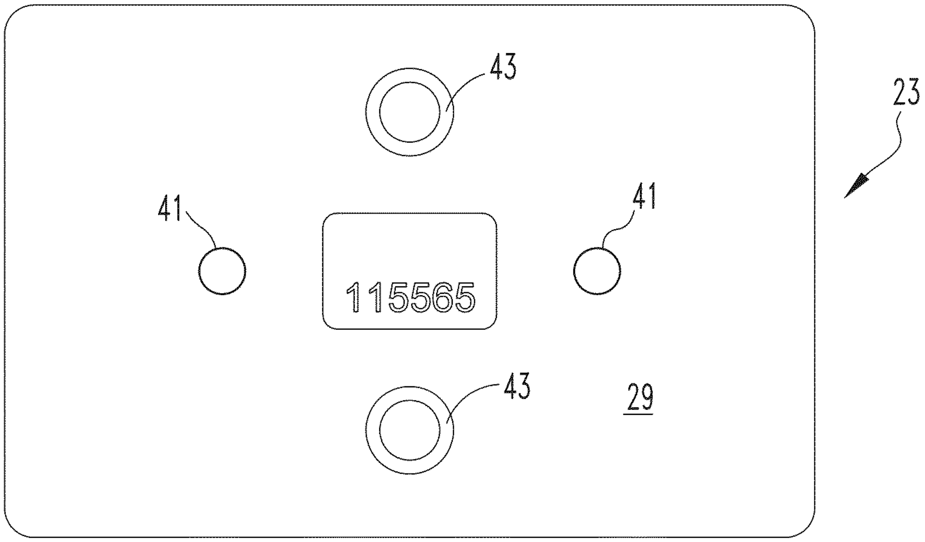
FIG. 9 is an overhead view of the pad.
Figure 10:
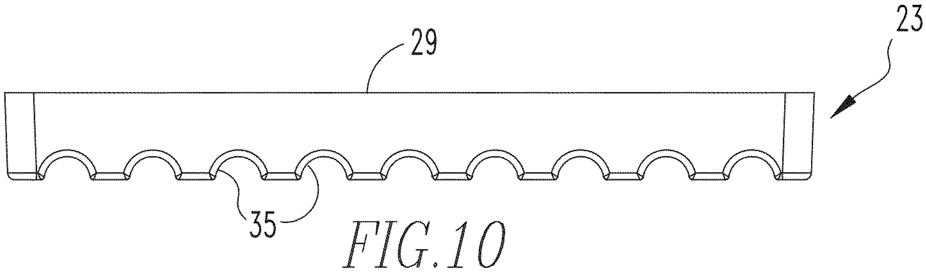
FIG. 10 is a side view of the pad.
Figure 11:
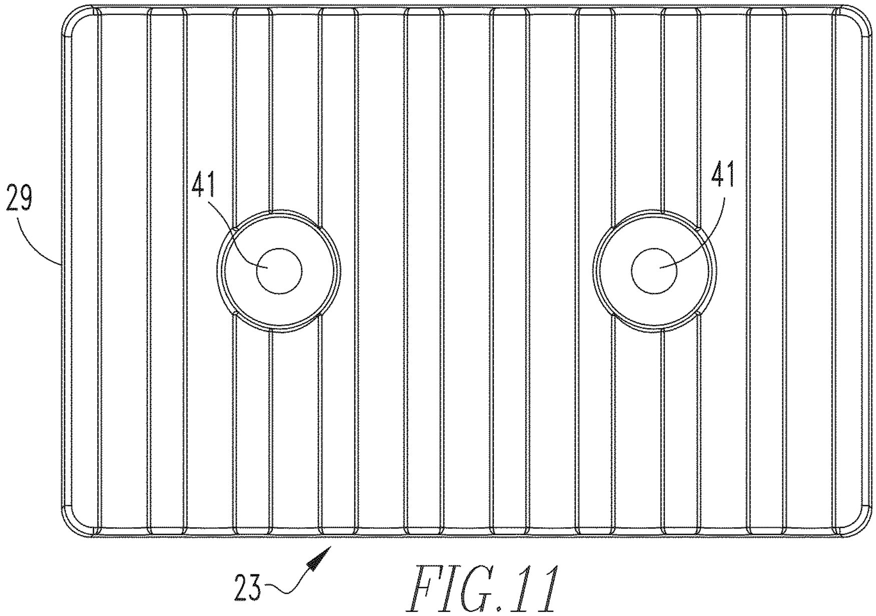
FIG. 11 is a bottom view of the pad.
Figure 12:
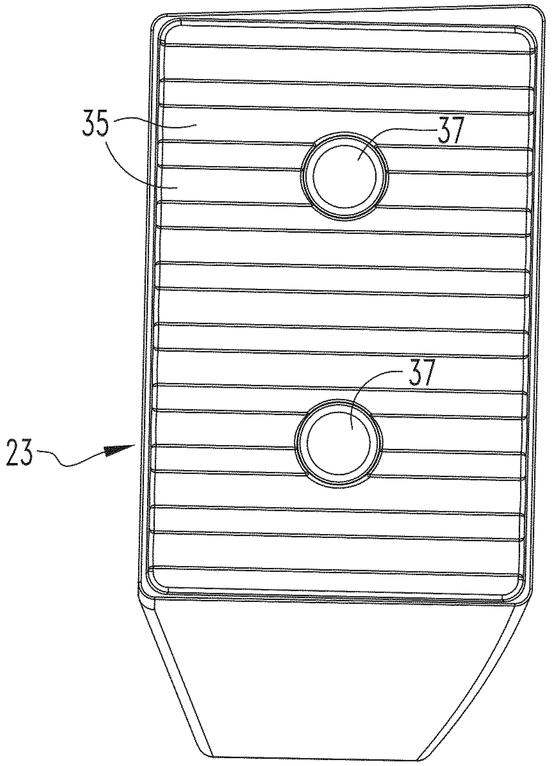
FIG. 12 is a bottom view of the pad and body.
Figure 29:
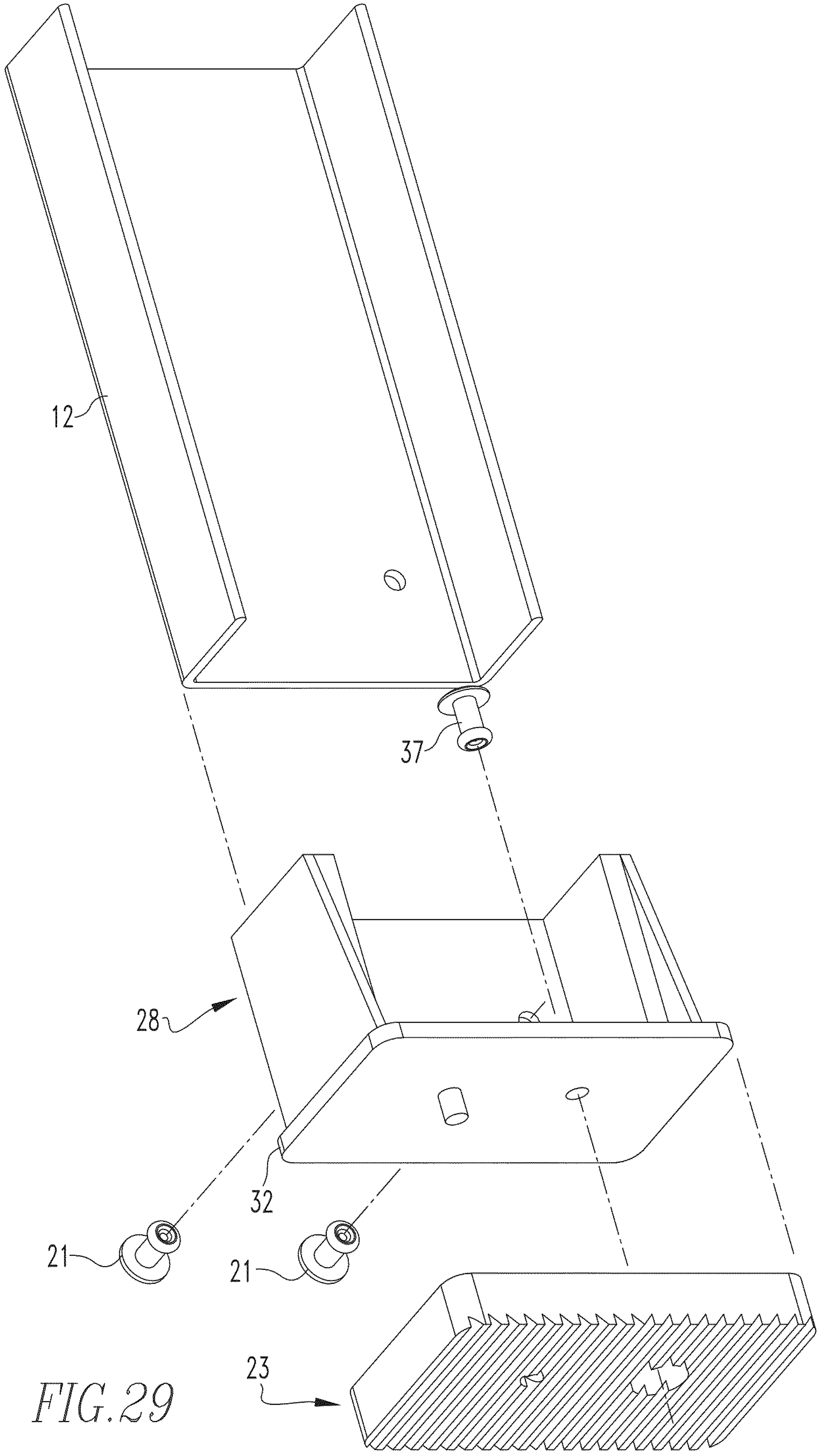
FIG. 29 is an underside perspective exploded assembly view of a foot with a single fastener and a single projection and the rail.

There may be two pad fasteners 37, as shown in FIG. 12, which fasten to a metal brace 49 disposed on the top side 34, as shown in FIGS. 2-4 and 13, to better secure the pad fasteners 37, such as rivets, in place and hold the pad 23 to the base 32. The pad fasteners 37 hold the pad 23 to the base 32 and prevent the pad 23 from being pulled or torn off the base 32 under normal use. The base 32 may have a projection 65, as shown in FIGS. 5 and 14-16, and the outer layer 29 may have a top with a projection hole 43, as shown in FIG. 9, into which the projection 65 extends to prevent the pad 23 from rotating relative to the pad fasteners. The projection 65 may be a solid cylinder or rectangle that extends down from the bottom 33 between ⅛ and ⅓ of an inch, and preferably about 0.20 of an inch. The base 32 is between 3 inches and 4 inches and preferably about 3.6 inches long, between 2 inches and 2.75 inches and preferably 2.4 inches wide, and between ¼ of an inch and ½ of an inch and preferably about ⅓ of an inch thick. The length and width of the pad 23 is about 0.1 inch less than that of the base. Each projection 65 is at the center of the base 32 lengthwise and about ½ of an inch from its closest side of the base 32. Each pad hole 41 is at the center of the base widthwise and about 1 inch from its closest side of the base 32. If desired, the foot 26 can have only one pad fastener hole 41 and be used on the rear rails of a step ladder, as shown in FIG. 29. The plate 27 is between 0.04 inch and 0.1 inch thick and preferably about 0.062 inch thick if made of steel. If a rigid plastic or fiberglass used for the plate 27, the thickness may be between 0.07 inch and 0.13 inch and preferably about 0.100 inch. The rigid plate 27 overmolded in the outer layer 29 gives strength, rigidity and support to the outer layer in terms of forces as well as shape, so the outer layer 29 better maintains its shape and withstands forces than if the pad 32 was simply made of rubber. The rigid plate 27 serves to act as an anchor for the metal pad fasteners 37 to grip and fix to the pad 23 and thus the pad 23 to the base 32. In this way, no barbs of rubber are needed to extend through the base 32 to assist in holding the pad 23 to the base 32. In fact, if the fasteners 37 are not in place, the pad 23 would simply fall off the base 32, there being nothing else to hold the pad 23 to the base 32. The projections 65 do not provide any type of attachment to the pad 23.

Figure 13:
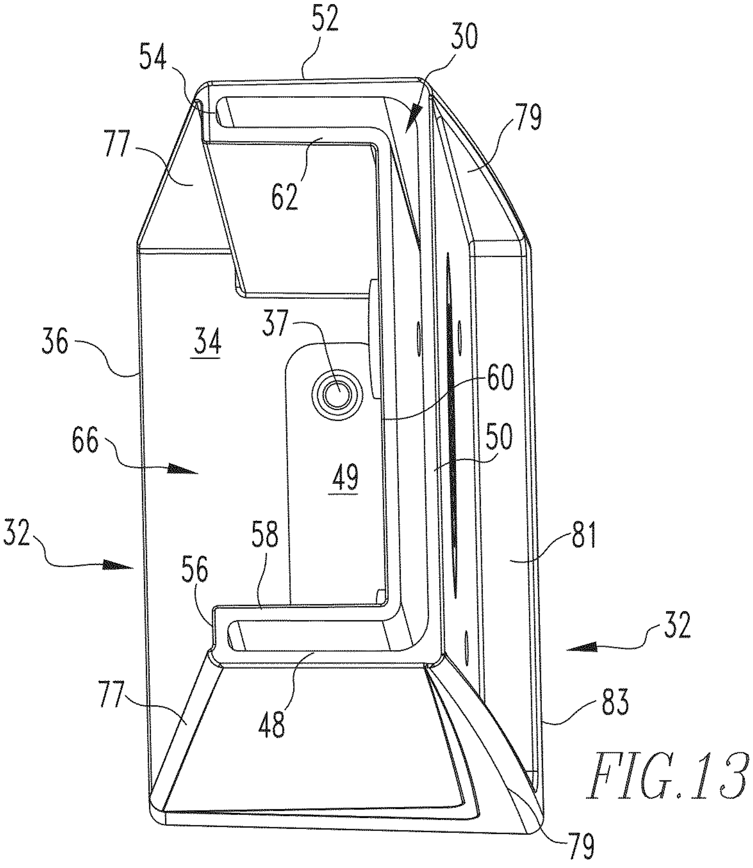
FIG. 13 is an overhead perspective view of the body.

The body 28 may have a first wall 48, a second wall 50 directly connected to the first wall 48, a third wall 52 directly connected to the second wall 50 and a fourth wall 54 directly connected to the third wall 52, as shown in FIGS. 2 and 13. The body may have a fifth wall 56 that directly connects to and extends essentially perpendicular from the first wall 48, a sixth wall 58 that directly connects to and extends essentially perpendicular from the fifth wall 56 and in parallel and in spaced relation with the first wall 48, a seventh wall 60 that directly connects to and extends essentially perpendicular from the sixth wall 58 and in parallel and in spaced relation with the second wall 50, and an eighth wall 62 that directly connects to and extends essentially perpendicular from the seventh wall 60 and in parallel and spaced relation with the third wall 52. The fourth wall 54 directly connects to and extends essentially perpendicularly from the eighth wall 62. The first through eighth walls 48, 50, 52, 54, 56, 58, 60, 62 may extend upwards more than 2 inches from the base 32.

Figure 6:
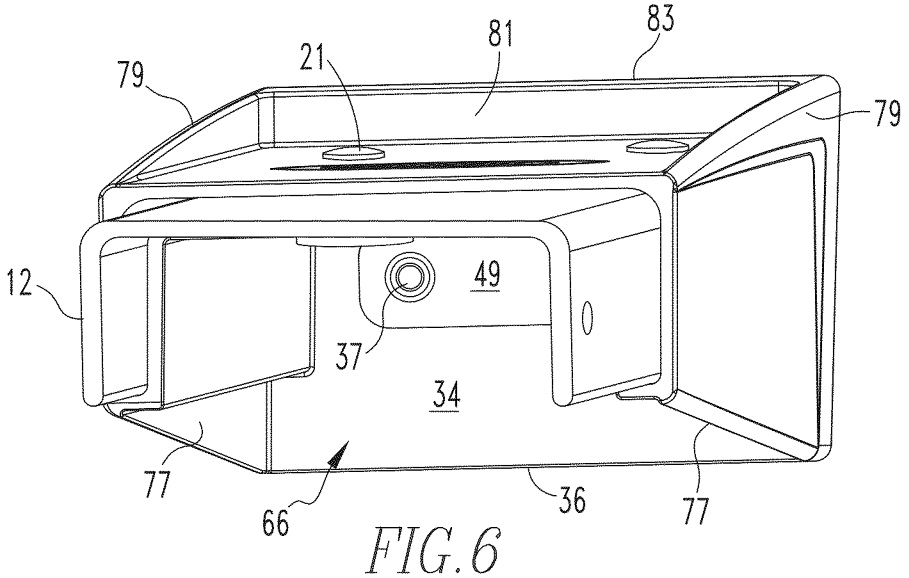
FIG. 6 shows an overhead perspective view of the foot with the rail.
Figure 7:
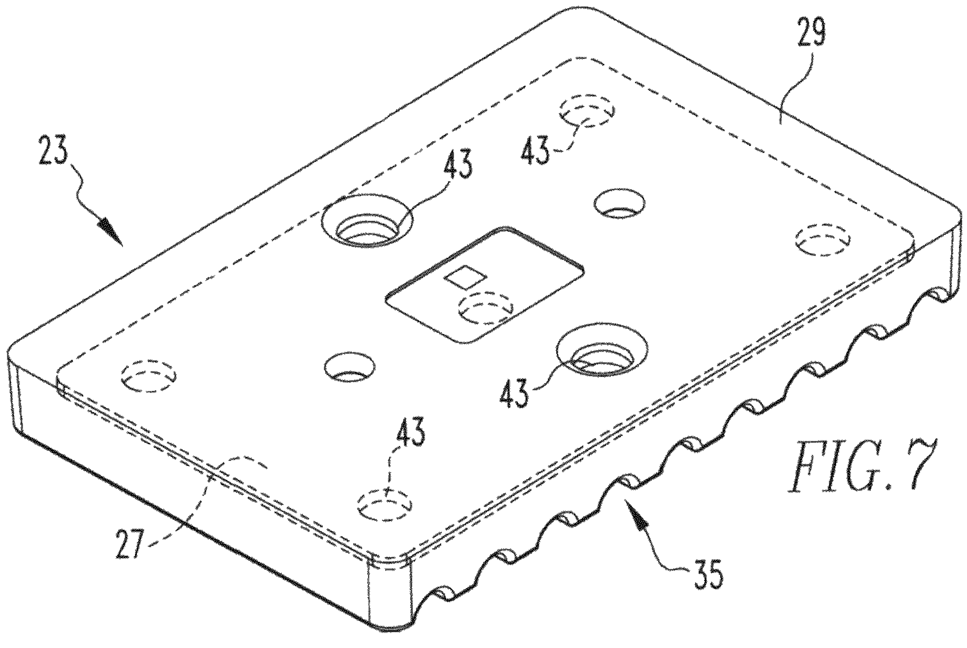
FIG. 7 shows a perspective view of the pad with a rigid plate in the over molded outer rubber layer.
Figure 8:
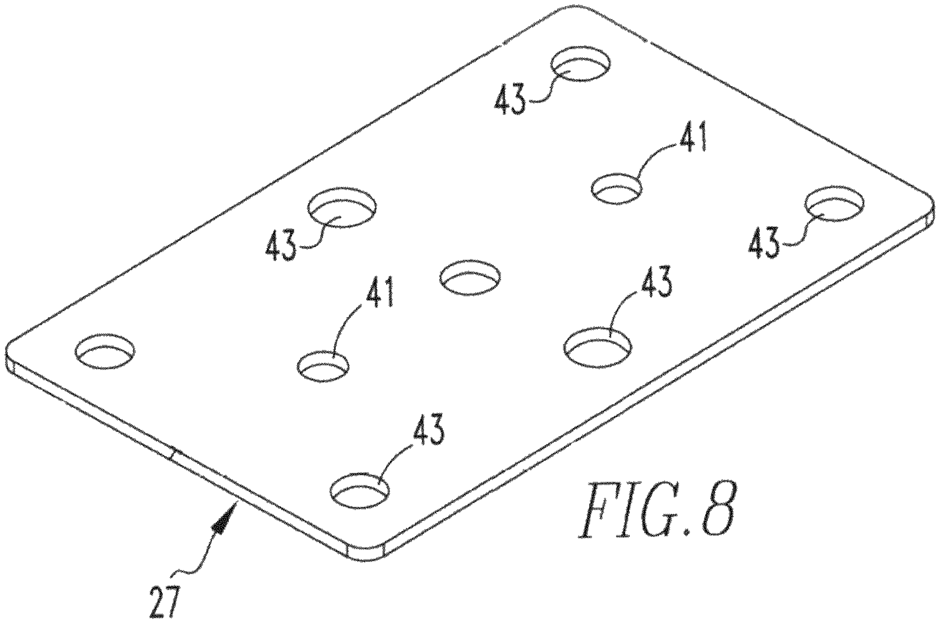
FIG. 8 shows a perspective view of the rigid plate.

The first wall 48 and the third wall 52 may each have front extensions 77, which extend past the fifth wall 56 and the fourth wall 54, respectively to the front edge 36 of the base 32, as shown in FIGS. 6 and 13. The front extensions 77 serve to provide further buttressing and support to the base 32 against forces that may be applied to the pad 23 at or near the front edge 36 of the base 32 and between the front edge 36 and the fourth and fifth walls. The front extensions are preferably of a triangular shaped. The first wall 48 and the third wall 52 may each have a rear extension 79 which extends past the second wall 52 at an angle to a corner of the rear edge 83 of the base 32. The rear extensions also serve to provide further buttressing and support to the base 32 against forces that may be applied to the pad 23 at or near the rear edge 83 of the base 32 and between the rear edge 83 and the second wall 50. There is a rear portion 81 of the base 32 that may exist because the second wall 50 that forms the recess 30 received the first rail 12 is offset from the rear edge 83 so the walls that define the recess 30 better conform to the cross-sectional shape of the first rail 21, while reducing the amount of material needed for the walls. The rear extensions 79 are also preferably of a triangular shape. The front and rear extensions serve to provide buttressing and support out to the four corners of the base 32, and thus to the entire base 32 against forces that may be applied to the foot 26.

Figure 14:
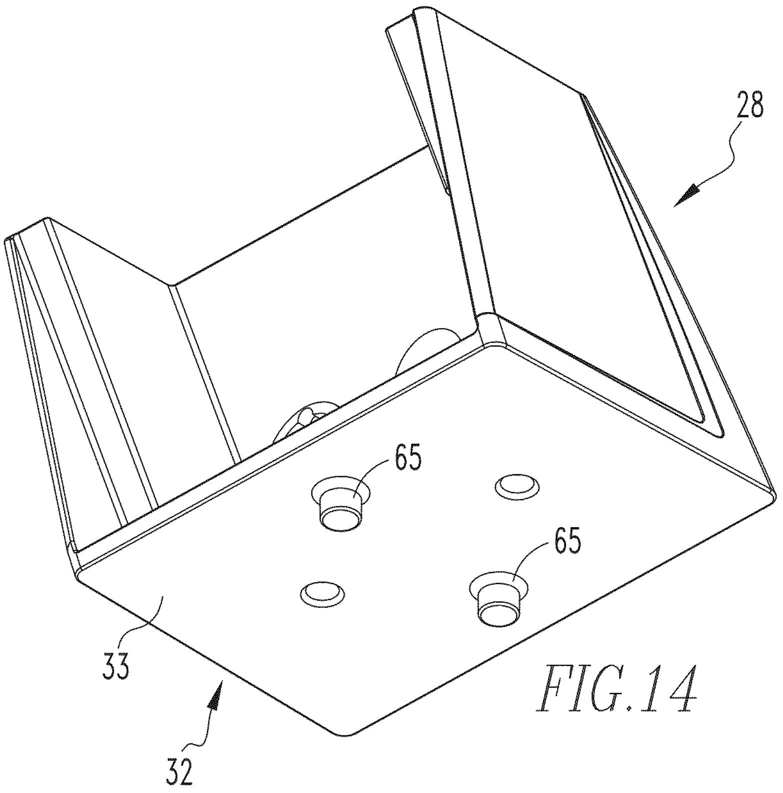
FIG. 14 is an underside perspective view of the body.
Figure 16:
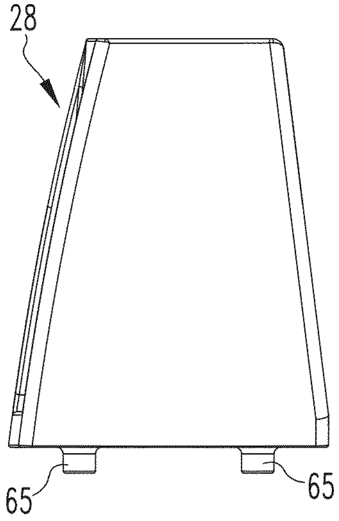
FIG. 16 is a side view of the body.
Figure 15:
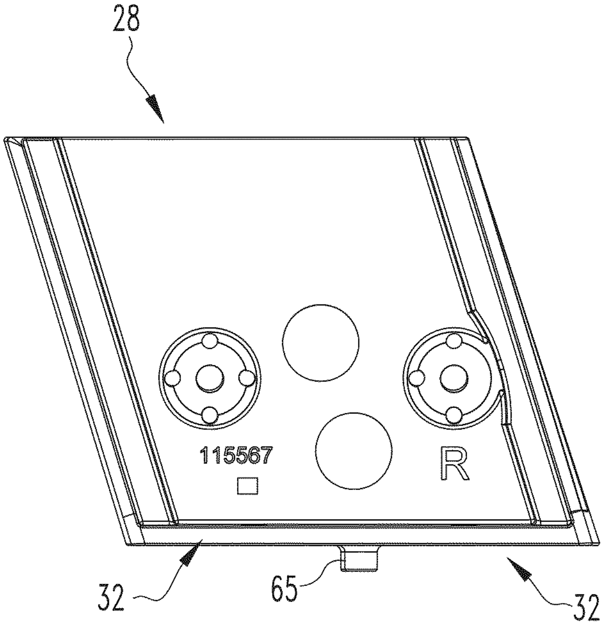
FIG. 15 is a side view of the body.

The front edge 36 may be in spaced relation with and about ½ inch apart from the fourth and fifth walls 54, 56; and the seventh wall 60 may be in spaced relation and about 2 inches apart from the front edge 36. There may be an open area 66 between the front edge 36 and the fourth, fifth and seventh walls 54, 56, 60, as shown in FIGS. 2, 3 and 6. The body 28 and base 32 and projections 65 may be one continuous piece. The underside 42 of the base 32 may be completely flat, except for the projections 65, as shown in FIGS. 14-16. The second wall 50 and the seventh wall 60 may have rivet holes 21 in which metal rail fasteners, such as rivets 68 extend through and into the first rail 12 to attach the foot 26 to the rail, as shown in FIGS. 2, 3, 4 and 6. The seventh wall 60 may have washer holders 69 to hold washers 71 about the rivet holes 21. The recess is defined by the first through eighth walls and has a c-shaped cross-section to match the cross-section of the first rail 12. All the walls and extensions and washer holders of the body 28 along with the base 32 are one continuous piece of plastic.

The present invention pertains to a foot 26 for a bottom 16 of a rail of a ladder 10, as shown in FIGS. 1-6. The foot 26 comprises a plastic body 28 with a recess 30 which receives the end of the first rail 12 and is positioned about and conforms to a web 18 and first and second flanges 20, 22 of the first rail 12. The foot 26 comprises a plastic base 32 having a top side 34 from which the body 28 extends. The base 32 has a front edge 36. The foot 26 has a metal rail fastener which extends through the body and the rail to attach the body and the rail together, a pad having a rigid plate with a rubber outer layer surrounding the rigid plate and a pad fastener hole that extends entirely through the rigid plate and rubber outer layer. The outer layer of the pad having a bottom with treads. The foot 26 has a metal pad fastener that extends entirely through the pad and entirely through the base to attach the pad to the base so the rigid plate is between the treads and the base of the shell.

The present invention pertains to a method for placing a ladder 10. The method comprises the steps of carrying the ladder 10 to a desired location. The ladder 10 comprises a first rail 12 having a bottom 16 and a web 18, a first flange 20 attached to a first end of the web 18 and a second flange 22 attached to a second end of the web 18. The ladder 10 comprises a second rail 14. The ladder 10 comprises rungs 24 attached to the first rail 12 and second rail 14 upon which a user steps to climb the ladder 10. The ladder 10 comprises a foot 26 having a plastic body 28 with a recess 30 which receives the end of the first rail 12 and is positioned about and conforms to the web 18 and the first and second flanges 20, 22 of the first rail 12. The foot 26 has a plastic base 32 having a top side 34 from which the body 28 extends. The base 32 has a front edge 36. There is the step of attaching the pad to the base with a metal fastener, such as a rivet that extends through a pad fastener hole and a base fastener hole. The foot 26 has a metal rail fastener which extends through the body and the rail to attach the body and the rail together. The pad having a rigid plate with a rubber outer layer surrounding the rigid plate and the pad fastener hole that extends entirely through the rigid plate and rubber outer layer. The outer layer of the pad having a bottom with treads. The foot 26 has a metal pad fastener that extends entirely through the pad and entirely through the base to attach the pad to the base so the rigid plate is between the treads and the base of the shell.

The present invention pertains to a method for forming a foot 26 for a bottom 16 of a first rail 12 of a ladder 10 rail. The method comprises the steps of placing a pad against a bottom surface of a base 32 of the foot. The foot having a plastic body 28. The plastic base 32 attached to the body 28. The plastic body 28 having a recess 30 which receives the end of the first rail 12 and is positioned about and conforms to a web 18 and first and second flanges 20, 22 of the first rail 12. The plastic base 32 having a top side 34 from which the body 28 extends. The base 32 having a front edge 36. There is the step of attaching a pad to the underside 42 of the base 32. The foot 26 has a metal rail fastener 21 which extends through the body 38 and the rail 12 to attach the body 28 and the rail 12 together. The foot 26 has a pad 23 having a rigid plate 27 with a rubber outer layer 29 surrounding the rigid plate and a pad fastener hole that extends entirely through the rigid plate 27 and rubber outer layer. The outer layer 29 of the pad 23 having a bottom with treads 35. The foot 26 has a metal pad fastener 37 that extends entirely through the pad 23 and entirely through the base 32 to attach the pad 23 to the base 32 so the rigid plate 27 is between the treads 35 and the base 32 of the body 28.

The dimensions of the foot 26 are dependent to the dimensions of the first rail 12. The tread 35 with the overmolded portion can be between 0.5 and 1.5 inches thick and preferably about 0.8 inches thick. The width of the recess 30 is slightly larger than the thickness of the rail that is inserted into the recess and may be between 0.1 and 0.3 inches and preferably about 1.5 inches. The length of the recess 30 between the second wall and the fifth wall, and the second wall and the fourth wall is slightly larger than the length of the first flange and second flange respectively, which may be between 0.75 and 2.5 inches and preferably about 1.5 inches; and the length of the recess between the third wall and the first wall is slightly larger than the length of the web, which may be between 2.5 inches and 4.5 inches and preferably about 3.1 inches. The rubber of the tread is preferably a standard PVC. The plastic of the body is preferably polypropylene.

The body 28 is made using a conventional plastic injection molding process. The pad 23 is made by what is technically called an insert molding process. First, the rigid plate (the "rigid plate 27") is placed into the mold. The mold is designed with internal features such as posts or, in the case of a ferrous metal rigid plate, magnets to hold the metal plate in the proper position. Then the mold is closed and melted rubber outer layer 29 material is injected into the mold, surrounding the metal plate. After cooling, the complete pad is taken out of the mold with the rubber outer layer 29 surrounding the rigid plate 27. The mold has a tread structure so the tread 35 is formed in the outer layer, and lands for the various holes, such as the pad fastener holes 41 and projection holes 43 to be formed in the outer layer that align with the necessary and associated pad fastener holes in the rigid plate 27.

Figure 17:
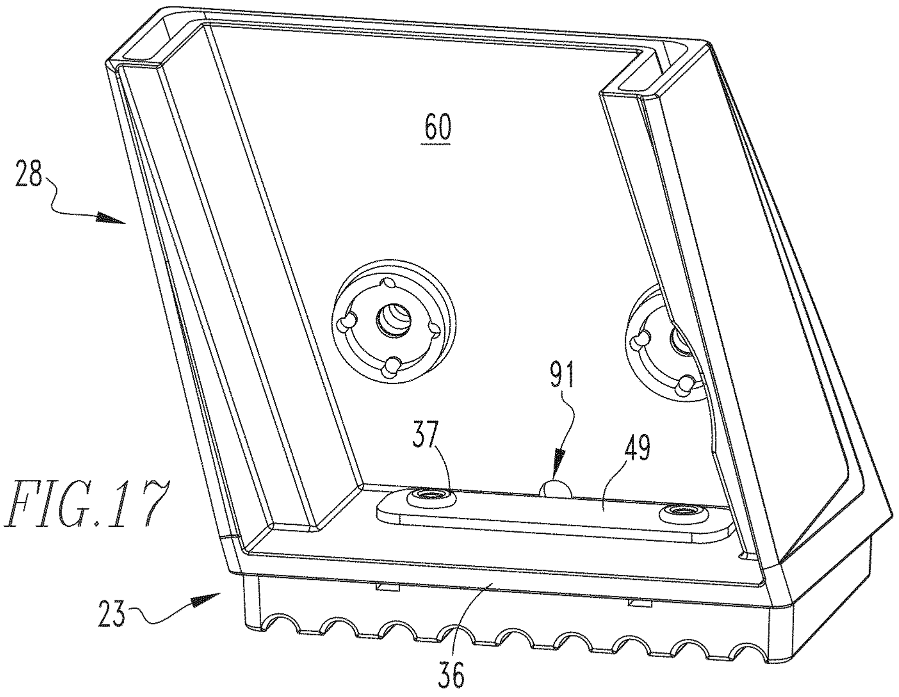
FIG. 17 shows a foot with a drain hole.
Figure 18:
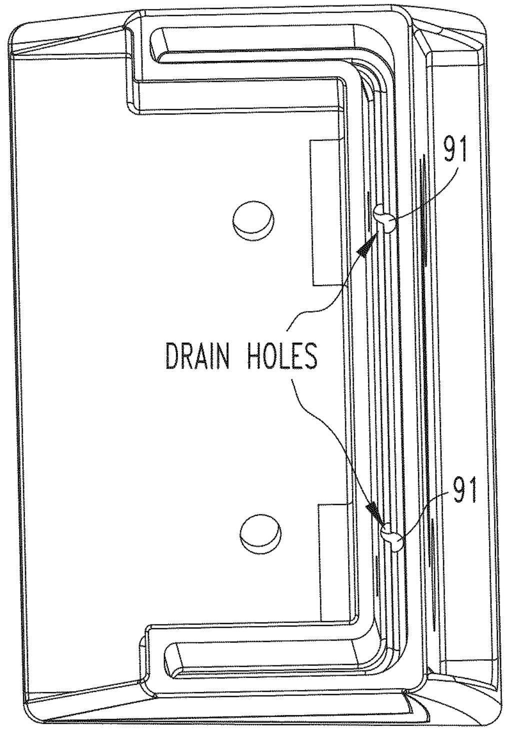
FIG. 18 is an overhead view of a foot with drain holes.
Figure 19:
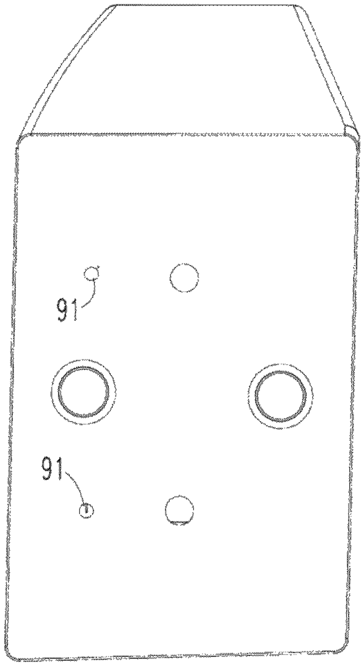
FIG. 19 shows a bottom view of the body with drain holes.
Figure 20:
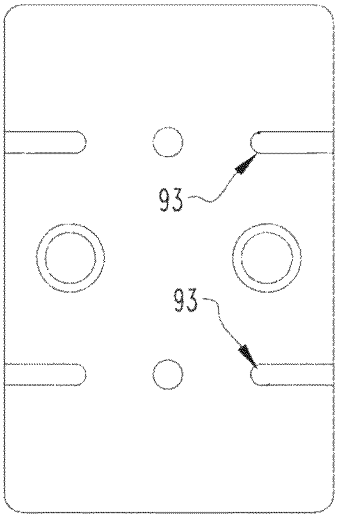
FIG. 20 is an overhead view of the pad with drain channels.
Figure 21:
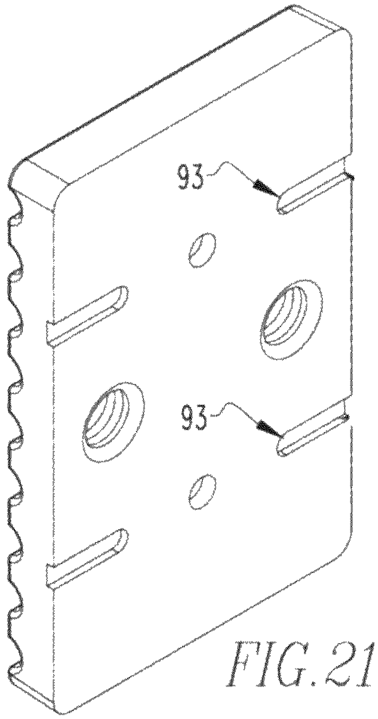
FIG. 21 is a perspective view of the pad with drain channels.
Figure 22:
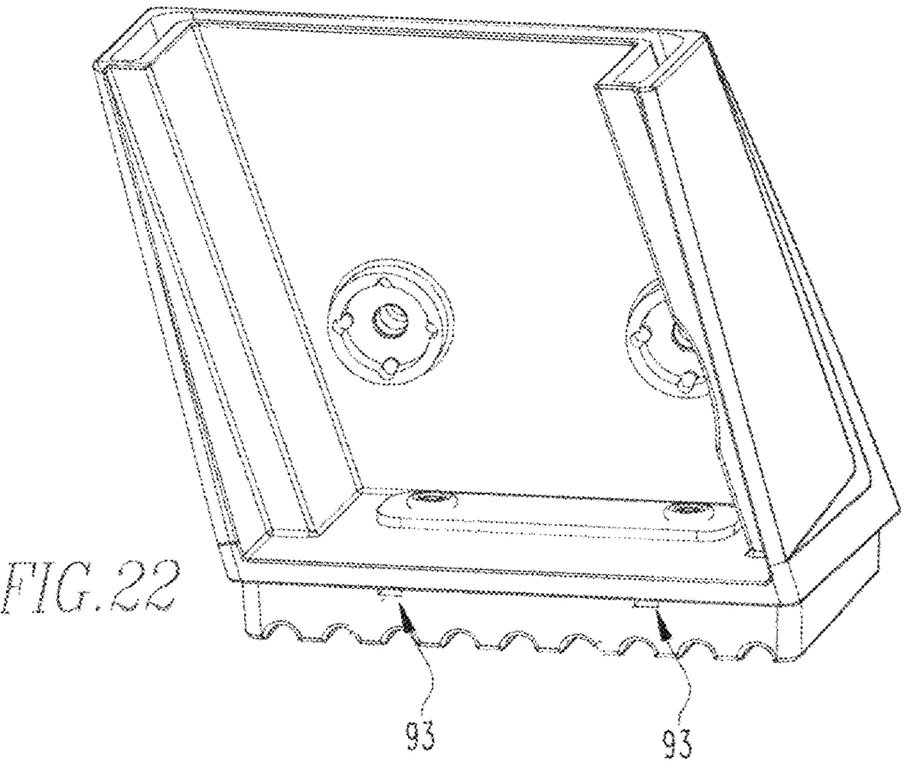
FIG. 22 is a front perspective view of the foot with drain channels.
Figure 23:
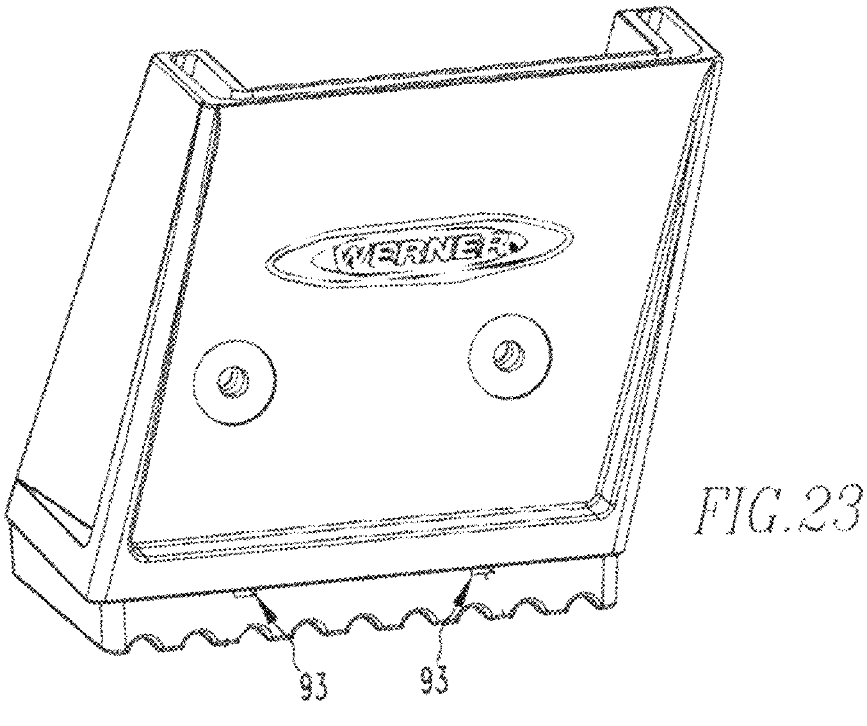
FIG. 23 is a rear perspective view of the foot with drain channels.

In the middle at the bottom of the seventh wall there may be a drain hole 91, as shown in FIG. 17. The drainhole 91 allows any water or fluid that enters the recess 30 to drain out of the recess 30. Alternatively, drain holes 91 may be positioned in the base 32 in the recess 30 as shown in FIGS. 18 and 19. The pad 23 has drain channels 93 that align with the drain holes 91 in the base 32 allows any water flow out of the recess 30 to the drainhole 91 into the drain channels 93 and out of the foot 26, as shown in FIGS. 20-23.

Figure 24:
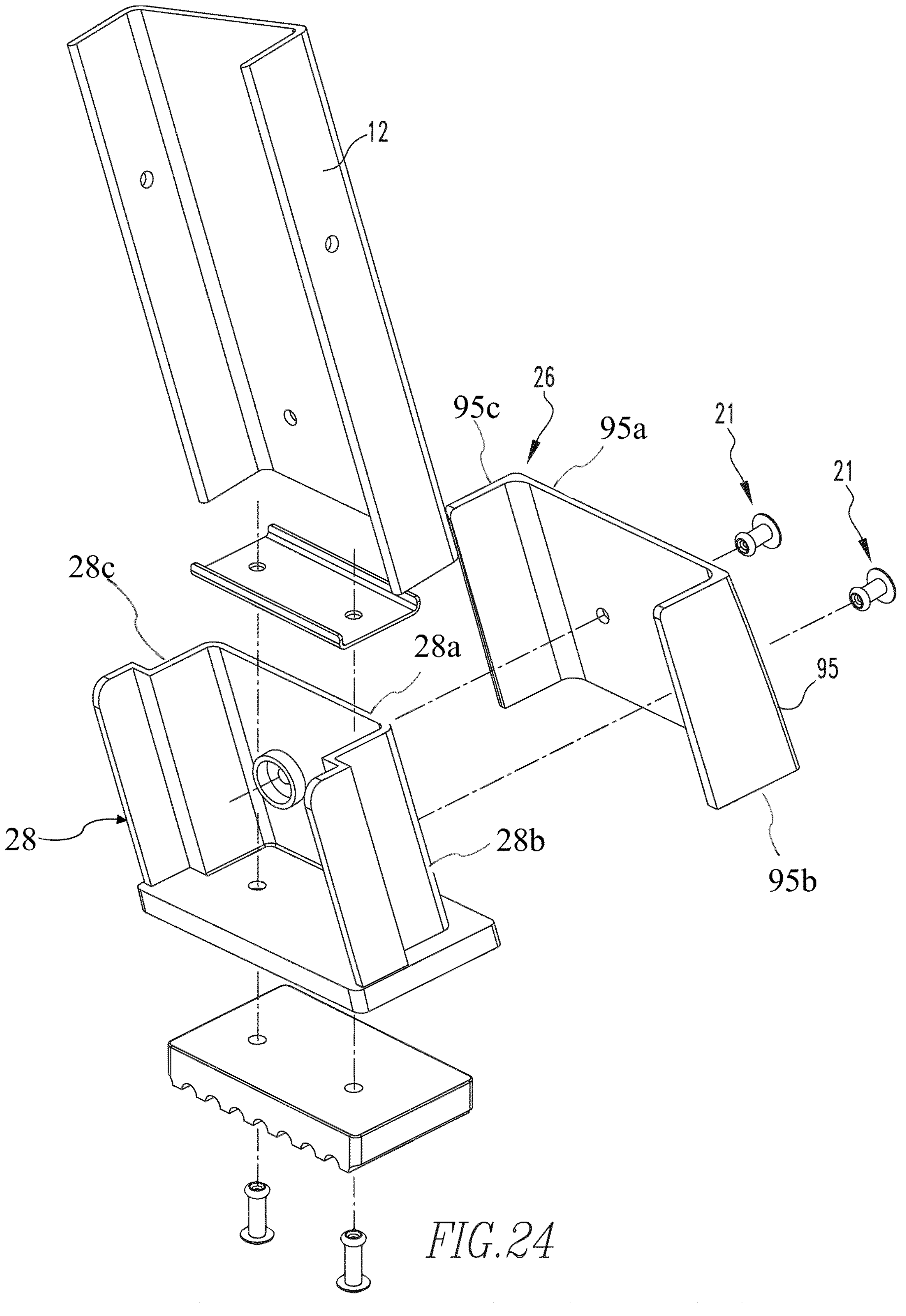
FIG. 24 is an exploded assembly view of an alternative embodiment of a foot with a shield.
Figure 25:
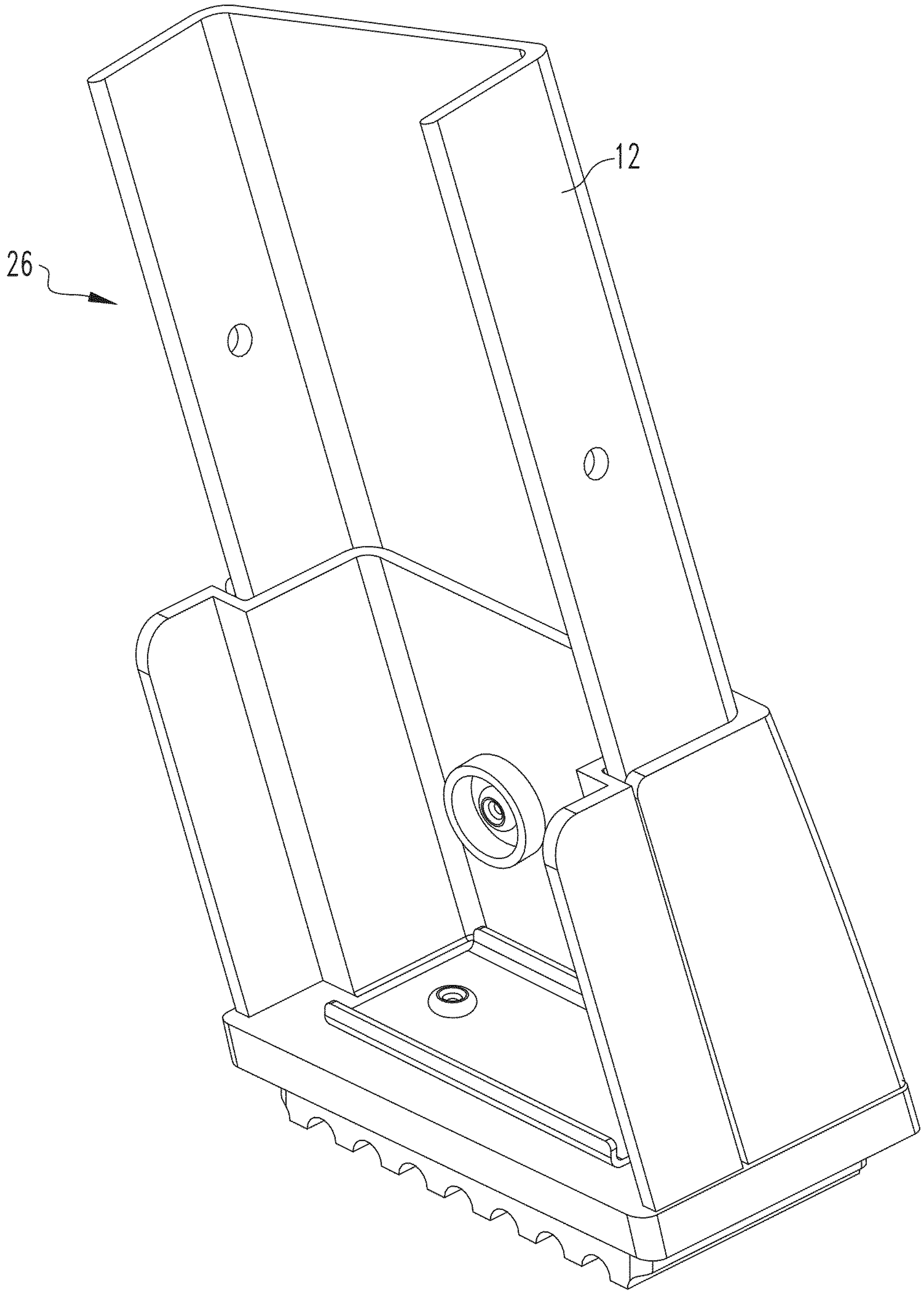
FIG. 25 is a perspective view of the foot with the shield.

In another embodiment, there can be a shield 95 that fits over the first rail 12 to protect the outside of the bottom of the first rail 12, as shown in FIGS. 24 and 25. Thus, the first rail 12 is between the foot body 28 and the shield 95, the foot body 28 having the c-shaped wall with a first web portion 28*a*, a first flange 28*b*, and a second flange 28*c*, and the shield 95 forming another c-shaped wall with a second web portion 95*a*, a third flange 95*b*, and a fourth flange 94*c*. The shield 95 and c-shaped wall of the foot body 28 basically form the c-shaped recess 30 when the shield 95 is fixed in place using the same fasteners that are used to attach the rail 12 to the body 28. In this case the fasteners 21 extend through the second web portion 95*a* of the shield 95, the first rail 12, and the first web portion 28*a* of the foot body 28. The shield 95 effectively replaces first wall 48 (via third flange 95*b*), second wall 50 (via second web portion 95*a*) and third wall 52 (via fourth flange 95*c*). The sixth, seventh and eighth walls, which in this embodiment are, respectively, the first flange 28*b*, the first web portion 28*a*, and the second flange 28*c* of the foot body 28 instead conform with the cross-section of the first rail 12 and the fourth and fifth walls act as a stop against which the front of the flanges of the first rail 12 contact.

Figure 26:
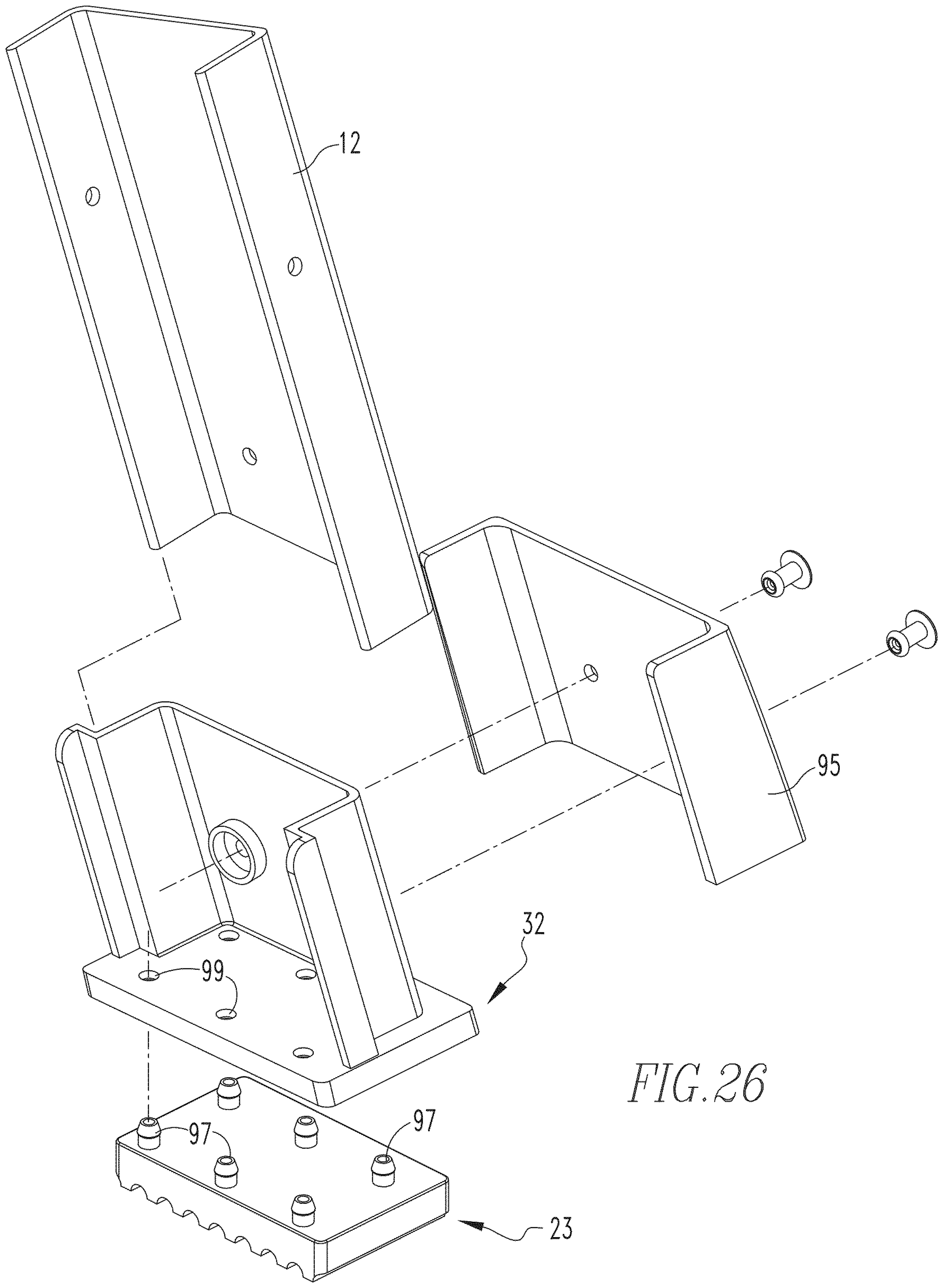
FIG. 26 is an exploded assembly view of another alternative embodiment of a foot with a shield and a pad with barbs.
Figure 27:
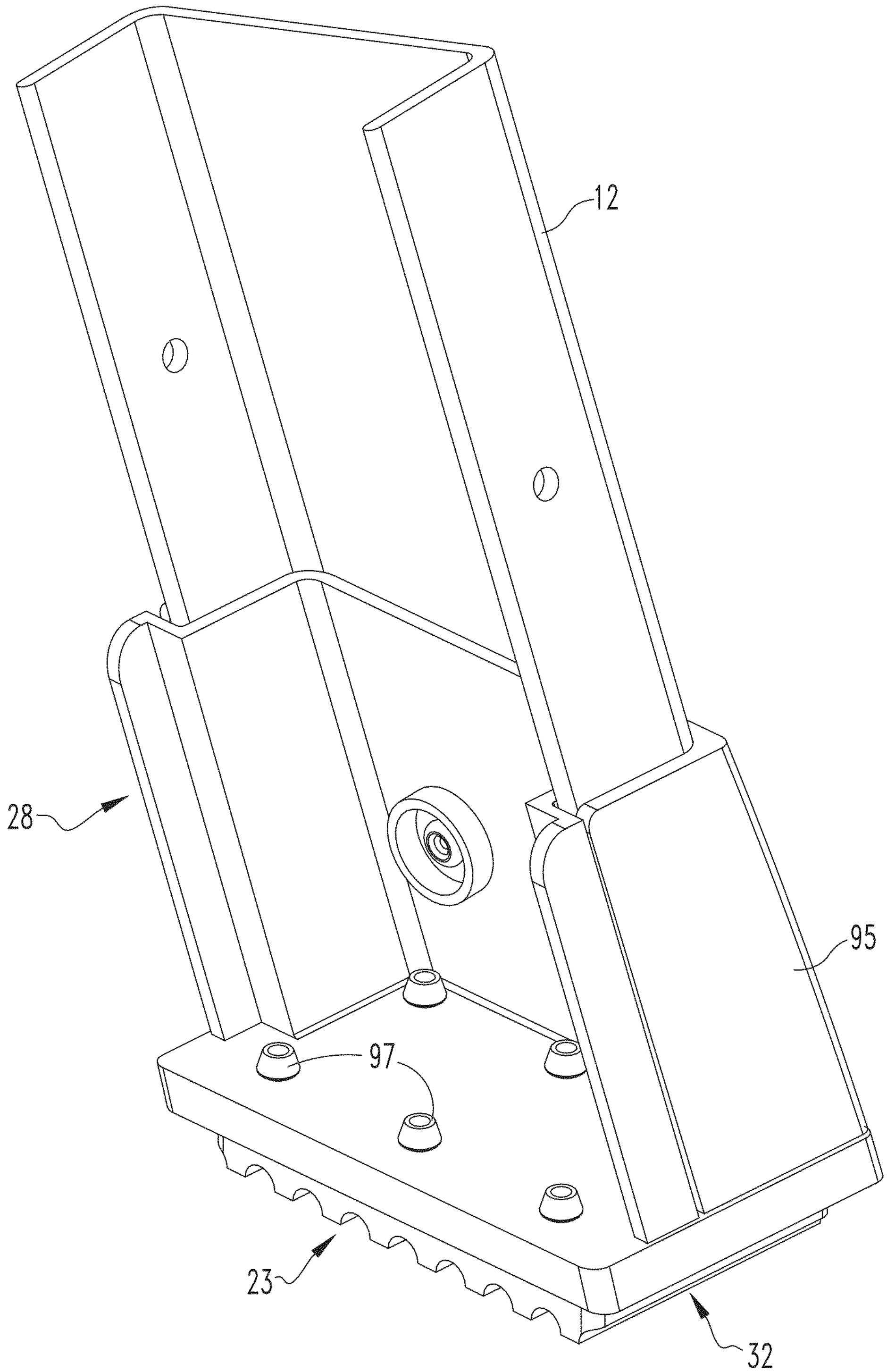
FIG. 27 is a perspective view of the foot with the shield and the pad with barbs.
Figure 28:
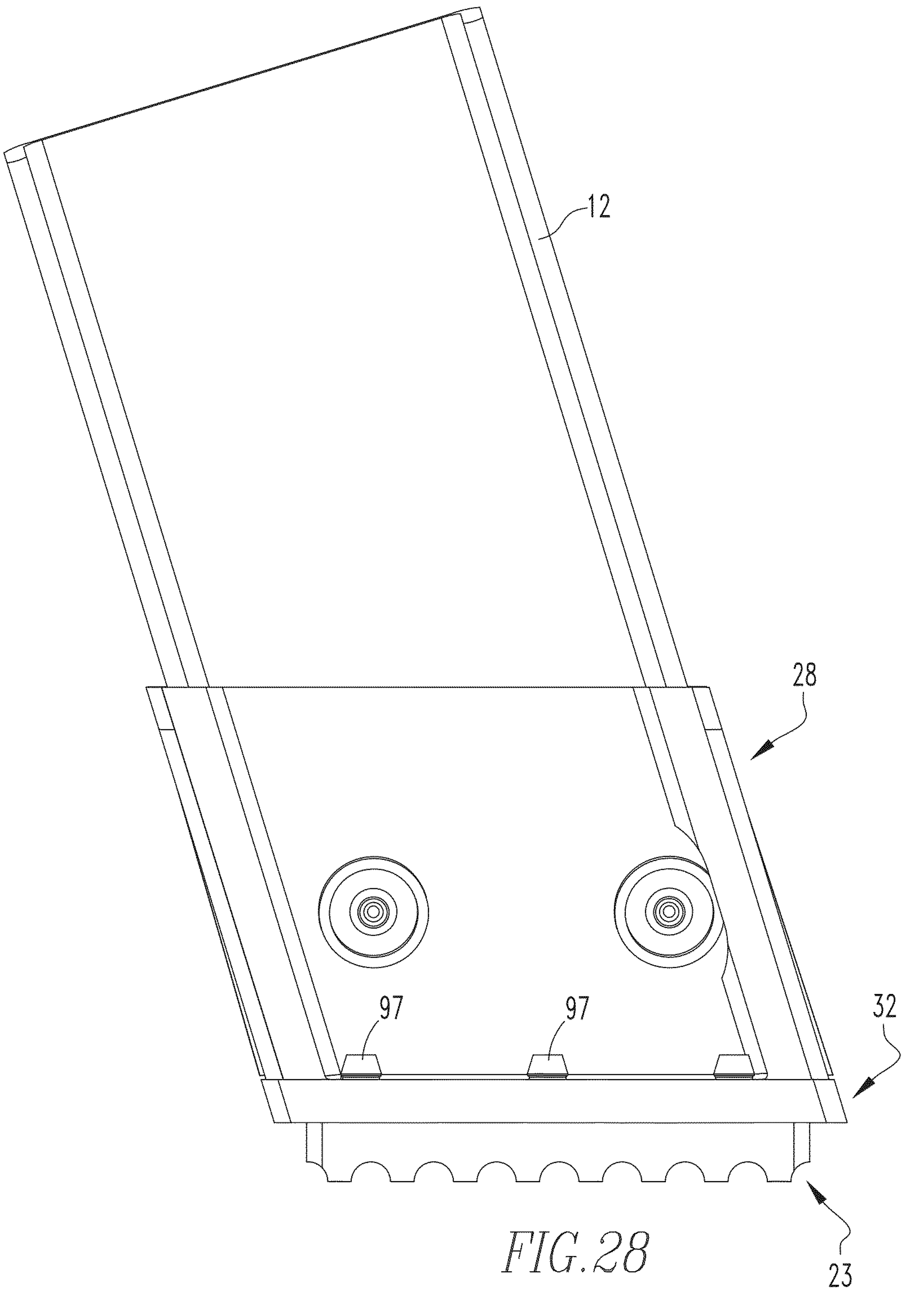
FIG. 28 is a side view of the foot with the shield and the pad with barbs and the rail.

In another embodiment, that is a variation of the embodiment using the shield 95, the pad 23 has barbs 97 that fit through base barb holes 99 to lock the pad 23 to the base 32 as shown in FIGS. 26, 27 and 28. In this embodiment, there is no rigid plate 27 but instead the pad 23 is entirely made out of rubber. The top and the bottom of the base 32 is completely flat and the barbs, made out of rubber have heads which compress as they are inserted through the base barb holes and expand after they extend out of the base barb holes to form a lock to hold the pad to the base 32. The foot 26 described herein can be a part of ladders with a duty rating of 375 lbs., or greater.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A ladder foot comprising:

a foot body comprising a base with a first planar surface, a first flange extending upwardly from the first planar surface of the base adjacent a first end of the first planar surface, a second flange extending upwardly from the first planar surface of the base adjacent a second end of the first planar surface substantially parallel to the first flange, and a first web portion extending upwardly from the first planar surface between the first flange and the second flange, wherein the base, the first flange, the first web portion, and the second flange define a single integral component such that the first flange and the second flange are fixed with respect to the first planar surface of the base; and a shield coupled around the foot body to form a c-shaped recess between the shield and the first web portion, the first flange, and the second flange, the c-shaped recess shaped to receive a bottom region of a rail of a ladder to sandwich the bottom region of the rail between the shield and the foot body, wherein the shield is defined in part by a first c-shaped wall comprising a second web portion, a third flange extending from a first end of the second web portion and a fourth flange extending from a second end of the second web portion, and wherein the first flange, the second flange, and the first web portion of the foot body define a second c-shaped wall of the foot body, wherein the second c-shaped wall of the foot body and the first c-shaped wall of the shield are nested such that the first flange and the second flange extend from the first web portion in a first direction and the third flange and the fourth flange extend from the second web portion in the first direction, and the c-shaped recess is defined between the first c-shaped wall and the second c-shaped wall and corresponds to a c-shaped cross-section of the bottom region of the rail.

2. The ladder foot of claim 1, further comprising a rail fastener configured to extend through the foot body and the shield to fixedly join the foot body and the shield together.

3. The ladder foot of claim 1, further comprising a pad coupled to an underside of the base at a second planar surface of the base, the pad having an uppermost planar surface coupled flush with the second planar surface of the base when the pad is secured to the base.

4. The ladder foot of claim 1, further comprising a pad coupled to an underside of the base, the pad having an uppermost planar surface coupled flush with a lowermost planar surface of the base when the pad is secured to the base, and wherein the pad includes a plate and an outer layer completely surrounding the plate, the outer layer including the uppermost planar surface.

5. The ladder foot of claim 4, further comprising a pad fastener that extends entirely through the pad by way of one of a plurality of holes in the plate and entirely through the base to attach the pad to the base.

6. The ladder foot of claim 5, wherein the outer layer is comprised of a rubber material having a bottom with treads, the foot body is comprised of a plastic material, and the pad fastener is comprised of a metal material.

7. The ladder foot of claim 1, wherein the first flange, the second flange, and the first web portion extend up from the base by a first height, wherein the first c-shaped wall of the shield rests on and extends up from the base by a second height when the shield is coupled to the base.

8. The ladder foot of claim 7, wherein the first height and the second height are at least 2 inches.

9. The ladder foot of claim 1, wherein a first height of the first c-shaped wall is the same as a second height of the second c-shaped wall.

10. A ladder comprising:

a first rail having a bottom region that extends a partial distance along the first rail from a distal end thereof;

a second rail;

rungs attached to the first rail and second rail;

a foot body having a base, the base having a first planar surface and a first flange extending upwardly from the first planar surface of the base adjacent a first end of the first planar surface and a second flange extending upwardly from the first planar surface of the base adjacent a second end of the first planar surface substantially parallel to the first flange, wherein the base, the first planar surface, the first flange, and the second flange define a single integral component such that the first flange and the second flange are fixed with respect to the first planar surface of the base;

a shield coupled to the foot body around the bottom region to sandwich the bottom region between the shield and the first and second flanges, the shield having a bottom that in its entirety overlays the first planar surface;

a pad coupled to an underside of the base, the pad having an uppermost planar surface coupled flush with a lowermost planar surface of the base when the pad is secured to the base, and wherein the pad includes a plate and an outer layer completely surrounding the plate, the outer layer including the uppermost planar surface; and a pad fastener that extends entirely through the pad by way of one of a plurality of holes in the plate and entirely through the base to attach the pad to the base.

11. The ladder of claim 10, further comprising a rail fastener that extends through the foot body, the first rail, and the shield to fixedly join the foot body, the first rail, and the shield together.

12. The ladder of claim 10, wherein the outer layer is comprised of a rubber material having a bottom with treads, the foot body is comprised of a plastic material, and the pad fastener is comprised of a metal material.

13. The ladder of claim 10, wherein the first rail includes a web with first and second flanges attached thereto to define an inner surface and an outer surface, and wherein the foot body contacts portions of the inner surface that are part of the bottom region and the shield contacts portions of the outer surface that are part of the bottom region.

14. The ladder of claim 13, wherein the inner surface and the outer surface comprise respective c-shapes that corresponds to a c-shaped cross-section of a recess defined between the foot body and the shield.

15. The ladder of claim 10, wherein the first flange and the second flange extend up from the base by a first height, wherein the shield comprises a plurality of walls that rest on and extend up from the base by a second height when the shield is coupled to the base.

16. The ladder of claim 15, wherein the first height and the second height are at least 2 inches.

17. The ladder of claim 15, wherein the first height is the same as the second height.

18. A ladder comprising:

a first rail having a bottom region that extends a partial distance along the first rail from a distal end thereof;

a second rail;

rungs attached to the first rail and second rail;

a foot body having a base, the base having a first planar surface and a first flange extending upwardly from the first planar surface of the base adjacent a first end of the first planar surface and a second flange extending upwardly from the first planar surface of the base adjacent a second end of the first planar surface substantially parallel to the first flange, and a first web portion extending upwardly from the first planar surface between the first flange and the second flange, wherein the base, the first flange, the first web portion, and the second flange define a single integral component such that the first flange and the second flange are fixed with respect to the first planar surface of the base; and a shield coupled to the foot body to form a c-shaped recess between the shield and the first web portion, the first flange, and the second flange of the foot body, the c-shaped recess shaped to receive the bottom region to sandwich the bottom region between the shield and the foot body, wherein the shield is defined in part by a first c-shaped wall comprising a second web portion, a second flange extending from a first end of the second web portion, and a third flange extending from a second end of the second web portion, and the first flange, the second flange, and the first web portion define a second c-shaped wall of the foot body, and the c-shaped recess is defined between the first c-shaped wall and the second c-shaped wall and corresponds to a c-shaped cross-section of the bottom region of the first rail, wherein the first web portion of the foot body has an inner surface facing an interior of the ladder and an opposing outer surface, and the first rail, the c-shaped recess, and the second web portion are disposed outwardly from the outer surface.

* * * * *